United States Patent
Chakra et al.

(10) Patent No.: US 10,223,138 B2
(45) Date of Patent: Mar. 5, 2019

(54) SOFTWARE INSTALLATION ASSISTANCE METHOD AND SYSTEM

(71) Applicant: INTERNATIONAL BUSINESS MACHINES CORPORATION, Armonk, NY (US)

(72) Inventors: Al Chakra, Apex, NC (US); Liam Harpur, Dublin (IE); Sumit Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/476,090

(22) Filed: Mar. 31, 2017

(65) Prior Publication Data
US 2018/0285130 A1    Oct. 4, 2018

(51) Int. Cl.
*G06F 9/451* (2018.01)
*G06F 8/61* (2018.01)
*G06F 11/30* (2006.01)
*G06F 11/34* (2006.01)

(52) U.S. Cl.
CPC ............. *G06F 9/453* (2018.02); *G06F 8/61* (2013.01); *G06F 11/302* (2013.01); *G06F 11/3495* (2013.01)

(58) Field of Classification Search
None
See application file for complete search history.

(56) References Cited

U.S. PATENT DOCUMENTS

| 7,975,265 B2* | 7/2011 | Schnoebelen | G06F 11/2294 714/2 |
| 8,806,476 B2* | 8/2014 | Kapoor | G06F 8/61 714/37 |
| 9,058,230 B1* | 6/2015 | van Rietschote | G06F 8/61 |
| 2003/0163807 A1* | 8/2003 | Drake | G06F 8/61 717/174 |
| 2008/0141240 A1* | 6/2008 | Uthe | G06F 8/61 717/174 |
| 2010/0192227 A1* | 7/2010 | Dai | G06F 21/56 726/24 |
| 2015/0172232 A1* | 6/2015 | Creasman | H04L 41/0806 709/204 |
| 2015/0301071 A1* | 10/2015 | Dhan | G01N 35/0092 702/108 |

(Continued)

OTHER PUBLICATIONS

UserHeat, "Free Heatmap Analytics Tool", 2016, Published by User Heat at https://userheat.com/blog/category/case-study/ (Year: 2016).*

(Continued)

*Primary Examiner* — Hossain M Morshed
(74) *Attorney, Agent, or Firm* — Schmeiser, Olsen & Watts; Brian Restauro

(57) ABSTRACT

The present invention is a software installation assistance method and system to monitor the behavior of users and provide assistance during installation and configuration of software. A single user's behavior is compared with the behavior of a group of users and when an installation problem occurs as determined by the comparison, then technical assistance is proactively offered to the single user in the form of suggested resolution steps based on the behavior and interaction of other users.

20 Claims, 5 Drawing Sheets

(56) References Cited

U.S. PATENT DOCUMENTS

2016/0063379 A1* 3/2016 Adderly .................. G06N 5/04
                                                    706/11
2017/0034023 A1* 2/2017 Nickolov ............ H04L 43/0817

OTHER PUBLICATIONS

Tivoli Application Dependency Discovery Manager; Gain visibility into application and their IT infrastructure Dependencies; Retrieved from the Internet Nov. 18, 2016; URL: HTTP://www-03.ibm.com/software/products/en/tivoliapplicationdependen . . . / 2 pages.

U.S. Appl. No. 15/088,613; filed Apr. 1, 2016; Confirmation No. 5501.

U.S. Appl. No. 15/172,235; filed Jun. 3, 2016; Confirmation No. 4616.

* cited by examiner

|  | BASELINE | USER1 |
|---|---|---|
| MOUSE CLICKS | 15 | 5 |
| TOTAL TIME (MINUTES) | 20 | 30 |
| AVG. TIME IN MENU A | 5 | 30 |
| AVG. TIME IN MENU B | 15 | 0 |

US 10,223,138 B2

SOFTWARE INSTALLATION ASSISTANCE METHOD AND SYSTEM

TECHNICAL FIELD

The invention relates generally to a system and method for assisting a user with installation of software, and more particularly to a system and method for monitoring the behavior of the user installing the software and offering technical assistance when needed.

BACKGROUND

Difficulty with installation of software and related configuration files is commonplace. Accordingly, there is a need for improved systems and methods to assist users in software installation and configuration.

SUMMARY

The present invention is a software installation assistance method and system to monitor the behavior of users and provide assistance during installation and configuration of software. A single user's behavior is compared with the behavior of a group of users and when an installation problem occurs as determined by the comparison, then technical assistance is proactively offered to the single user in the form of suggested resolution steps based on the behavior and interaction of other users.

The software installation assistance method, includes the steps of: monitoring, by a computing device, behavior and interactions of a group of users to crowdsource the baseline process of installation and configuration data of software, by tracking and storing parameters related to the behavior of the group of users during the baseline installation, wherein the installation and configuration data of the group of users is stored on the computing device; monitoring in real-time, by the computing device, behavior and interactions of a single user in regards to a single user installation or configuration of the same software by tracking and storing the parameters related to the behavior of the single user during the single user installation, wherein the single user installation occurs subsequent to the crowdsource baseline installation of the group of users; comparing, by the computing device, the behavior of the single user to the behavior of the group of users; and proactively offering, by the computing device, technical assistance when a deviation of the behavior of the single user occurs in comparison to the behavior of the group of users.

DETAILED DESCRIPTION

Figure 1:
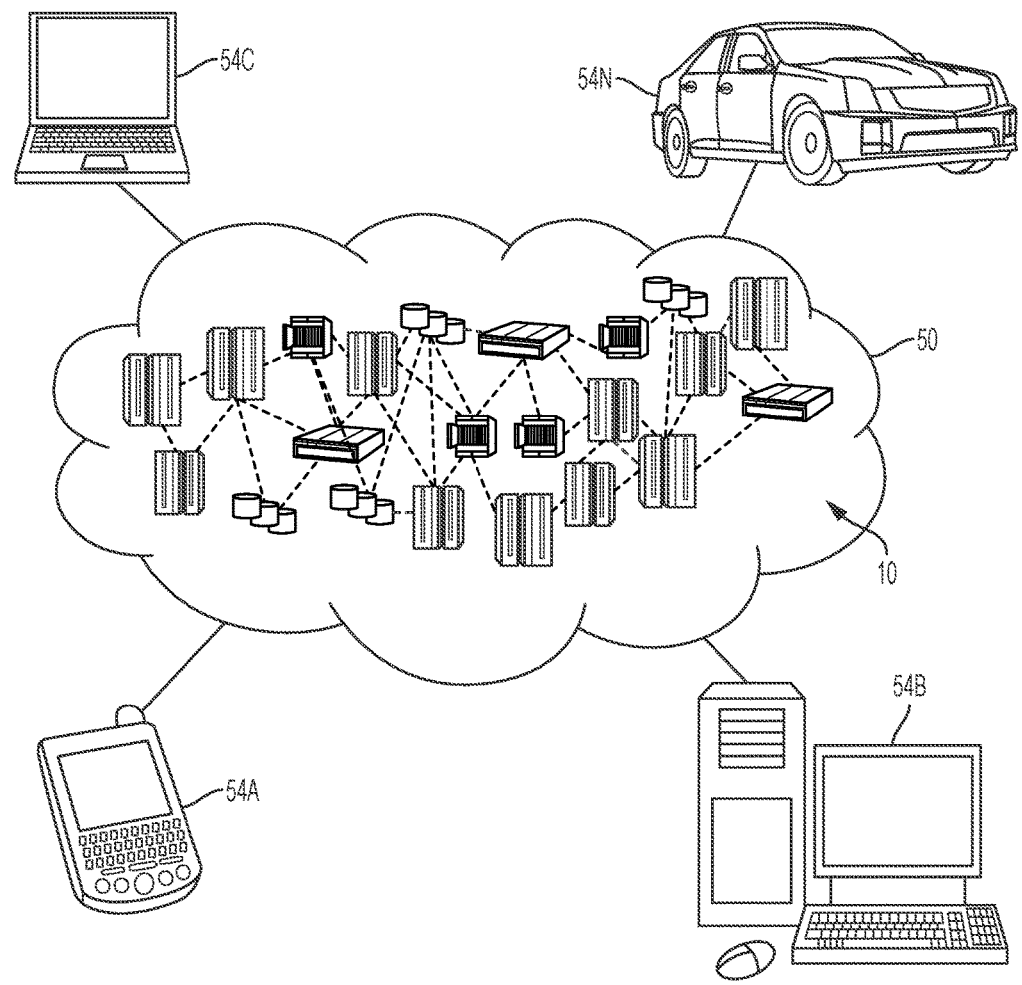
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
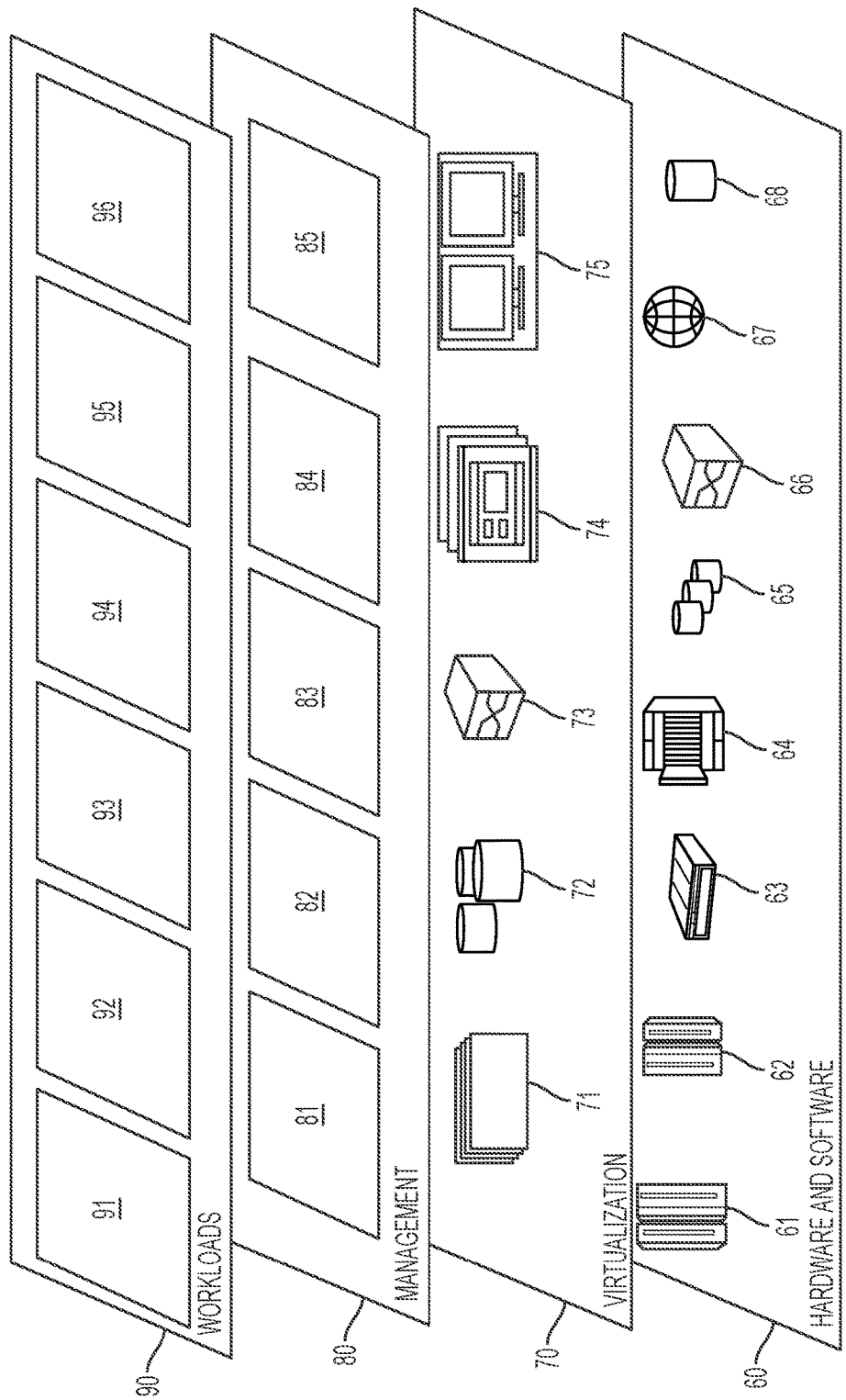
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and proactively offering technical assistance to a user installing software 96.

The software installation assistance method and system of the present invention includes steps and devices to:

(1) Determine optimal time at which to offer some type of proactive support based upon a single user's behavioral interactions with a system which deviate from baseline crowdsourced behavioral interactions of a group of users, or deviations from a manufacturer's set thresholds, or deviations from averages based on similar other users;

(2) Provide crowdsourced support based on where other users were within a similar installation process and the actions they took to advance in the process (i.e. 80% of users who spent ten minutes with a particular error, went on to the next step by resetting field 1 to FALSE); and (3) Automate user feedback for manufacturers based on real time interactions of endusers with the system (i.e. data for process improvements).

The software installation assistance method and system provides proactive customer support to end users, i.e. single users, who are in the process of interacting with the installation process, and are having problems with the installation or configuration of software. Proactive real-time support is offered or recommended, for instance, by the use of existing art such as chat windows, remote desktop control, redirection to a manufacturer support site, etc or in the novel form of suggestions based on the behavior of other users. The method and system are based upon detecting a deviation from a baseline process or from an automated, manufacturer-set, user experience which is triggered by an agent detecting the deviation, such as by section time outs, cursor heat maps, field validations, sequence validations, etc. In contrast to predictive maintenance systems which suggest modifications or changes to systems based upon current operating metrics, the software installation assistance method focuses on suggestions based on the user's behavioral interactions with regards to software installation and configuration.

Figure 3:
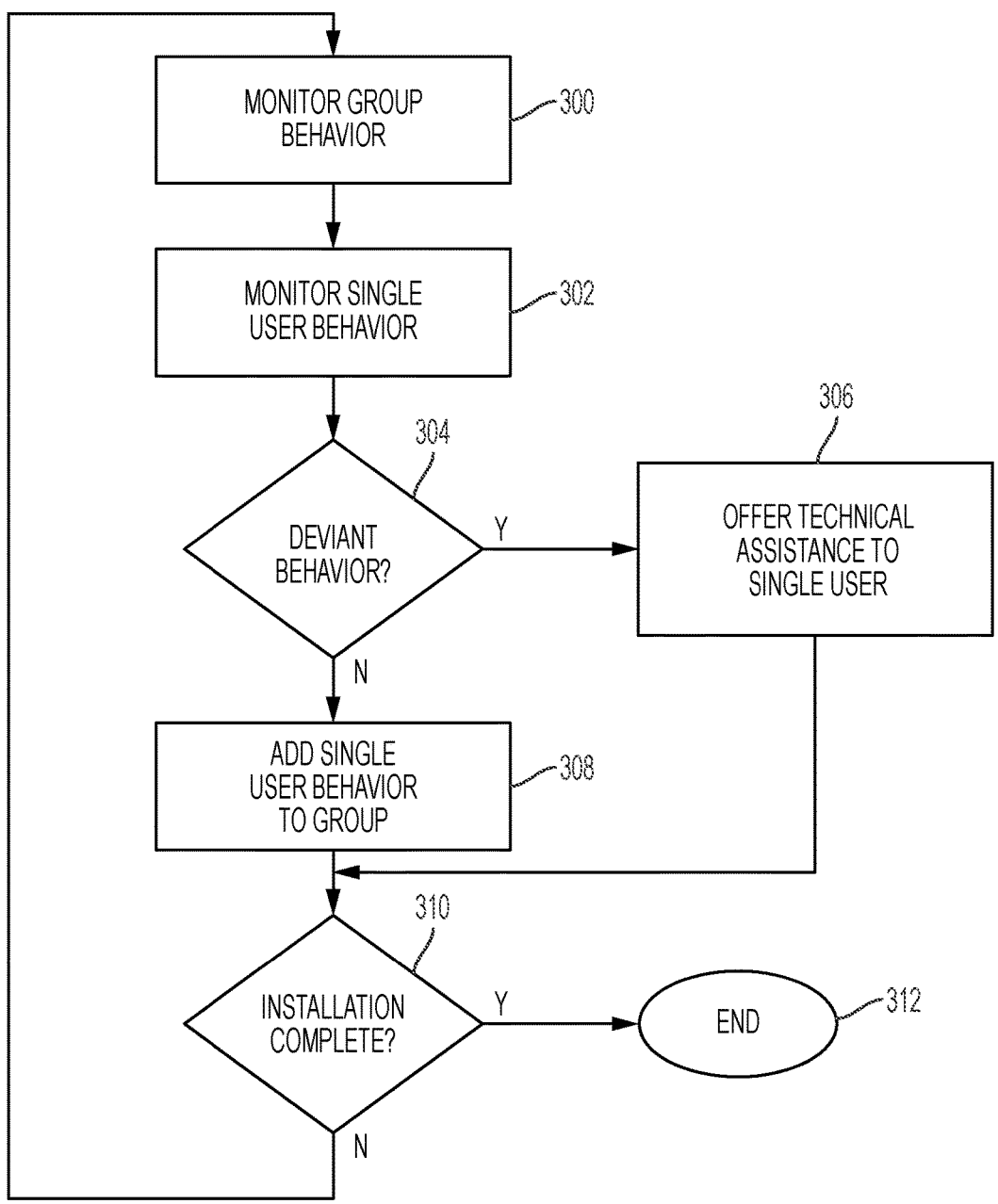
FIG. 3 is a flow chart diagram of a software installation assistance method in accordance with embodiments of the present invention.

FIG. 3 is a flow chart diagram of a software installation assistance method in accordance with embodiments of the present invention. In step 300 a computing device monitors the behavior of a group of users to crowdsource baseline installation with regards to installing and configuring a particular software application or software group. The monitoring is accomplished by tracking and storing installation and/or configuration parameters related to the behavior of the group of users during the baseline installation and/or configuration, wherein said installation and configuration data of the group of users is stored on the computing device. The computing device can be wired or wireless. It can be a server, smart phone, desktop, laptop or portable computing device. It could also be a system or multitude of computer devices linked together, such as a smart phone and linked computers and internet of thing IoT devices.

Monitoring, comparing and typifying user behavior during installation and configuration of a given software is preeminent. Moreover, these user behaviors can be monitored and quantified as described herein. For instance one user behavior can be the amount of time that a single user spends on any given step or phase of a software installation process. Other measurable user behaviors and associated parameters include, but are not limited to, (1) the number and/or speed or frequency of mouse clicks or mouse movement during a given time or within a give step of the installation process, (2) the need or frequency for a particular user to seek help during the installation process (i.e. clicking away from the installation or configuration screen) or during certain steps which typically require more attention, accuracy and time to complete, and (3) the amount of time, including delays or pauses, for a given user to traverse through each of the steps of the installation process.

Any type of input or data gathering entity can be used to track the parameters related to the behavior of the group of users during the baseline installation. For instance, the data gathering entity could be a device such as a mouse or a keyboard, or it could be a programmed application or subroutine for locating the position and timing of mouse movements, or for determining the delay between user actions (e.g. the time between mouse clicks, or the time spent on a particular task in an application).

In step 302 the computing device provides real-time monitoring of the behavior of a single user in regards to the baseline installation and configuration of the software. The single user installation occurs subsequent to the crowdsource baseline installation of the group of users so that the stored crowdsourced group data can be used as a measure of standard behavior for comparison. The single user monitoring is accomplished by tracking and storing parameters related to the behavior of the single user during the installation, wherein the installation and configuration data of the single user is stored on the computing device.

The device or software used for monitoring the behavior of the group of users includes using an agent to sequentially track the parameters related to the behavior of the group of users during the baseline installation. A behavioral parameter is defined as any parameter which can be utilized to measure or otherwise recognize a behavior of a user during software installation and/or configuration. The agent can be a device such as a mouse, timer or keyboard, or a software application for gathering data regarding parameters relating to the user's behavior. The parameters related to the behavior of the users during the baseline installation can include: user mouse clicks; average time between user actions; heat maps of user flow; completion time of installation tasks; and completion time of configuration tasks. Additionally, the software vendor may pre-load a set of envisioned parameters.

A comparison occurs in step 304 where the behavior of the single user during installation and/or configuration is compared with either the behavior of the group of users, or with pre-loaded vendor parameters. The pre-loaded parameters of the vendor can include, but are not limited to, user mouse clicks; average time between user actions; heat maps of user flow; completion time of installation tasks; and completion time of configuration tasks. These vendor parameters can be estimates of average user behavior (as approximated or empirically derived by the vendor), or they can be target values of the vendor for optimum installation behavior of a user.

If the single user's behavior falls within the same parameter thresholds as the crowdsourced behavior of the group of users and/or the vendor parameters, then the computing device enables the process to continue in step 308 where the single user's behavioral parameters are stored together with the previous crowdsourced data. If the single user's behavior is determined to be deviant beyond predetermined thresholds of the crowdsourced behavior, then the computing device enables the process to continue in step 306 where the computing device proactively offers technical assistance to the single user.

The comparing step 304 of the process of FIG. 3 is implemented by the computing device, for instance, by: using optical character recognition of keyboard characters selected by either the single user or the group of users during installation of the software; using variance calculations of the parameters related to either the single user or the group of users during installation of the software; determining time differences between actions by either the single user or the group of users during installation of the software; and determining cursor locations during the installation of the software by either the single user or the group of users using heat maps.

The step 306 of proactively offering technical assistance via the computing device, to the single user includes: providing a sequence of steps, inputs, or sequences followed based on the behavior of the group of users; providing a direct link to vendor chat; providing a link to product support documentation or tutorials; providing a link to an installation video; providing a link to a help page; and providing a link to a software patch. Other links to online help locations are also available.

Thresholds of parameter measurements would be established or predetermined either by user input, by analyzing the crowdsourced data collected for each parameter, or using a pre-loaded set of vendor data for installation or configuration. For instance, if one measured parameter is the amount of time spent by a user on a particular task during installation, then a range of values would be tracked and stored during installation by the group of users to generate average values. Perhaps the average time spent on the task is 30 seconds, plus or minus 10 seconds. In this case, if the single user goes outside of the normal range of 20-40 seconds for the task, then a deviation from the norm is detected in step 304, which would result in the process moving to step 306 in FIG. 3.

Technical assistance proactively offered via the computing device to the single user when the time spent on the particular task of the above example exceeds 40 seconds could be presented to the user in any form. The remedies, suggestions and/or solutions would primarily come from the crowdsourced group of users who have experienced a similar problem. Additionally, the single user could be directed to a help page, or to an installation manual, or to a blog for users having similar issues. There could be multiple suggestions or solutions to the same problem. For instance out of 1,000 previous users, perhaps 15 who experienced the same problem discovered that the only way to complete the installation was to reboot the system and start the installation from the beginning. Perhaps another 15 who experienced the same problem discovered that a different approach of inputting data (e.g. by a keyboard rather than by a mouse) solved the problem. The single user experiencing the same problem can choose from the different solutions. Moreover in step 306, proactively offering technical assistance to the single user could be provided as a message, or as a pop-up screen, as a visual or audio alert, or in any other known manner to alert the single user that a deviancy from the norm has occurred during installation/configuration and that technical assistance is available.

Step 310 determines whether the installation and configuration process is completed for the target software application. If the installation is complete, then the process ends in step 312. If the installation is not complete, then the process continues by looping back to step 300. The process of FIG. 3 in one embodiment could be used for each task parameter within the overall installation process, whereby the process continues to loop back to step 300 to monitor each parameter task. For instance if a software installation requires inputting three separate values, the behavior of the user in accessing, receiving or otherwise inputting each of the three values can be monitored by the process of FIG. 3. The measured behavior could, for example, be the time required by the user to accurately input or access each of the three values. If the average time as established from the crowdsourcing data for inputting each value is 10 seconds, plus or minus 3 seconds, then the process will determine whether the time during which the user inputs each of the three values falls within the allowable threshold range of 7 to 13 seconds for each input.

The complex nature of enterprise software creates a modular approach to installing or updating components as necessary. As a result, users often struggle with installing products or configuring them properly even after using the internet or technical support as a guide. From a vendor's perspective, this can lead to decreased customer satisfaction with the software and a potential likelihood for software to sit on the shelf. A proactive system can enable software vendors to track a user's experience during installation or configuration of software and offer real time help (including but not limited to suggestions from existing technical repositories, real time chat or phone support, desktop takeover, etc.) within the context of the scenario to get the software working for the user.

The software installation assistance system and method tracks an end user's experience during installation and configuration of software to proactively offer technical assistance when significant deviations occur from standard installation/configuration baselines. The vendor establishes a baseline behavioral database of empirical measured behavioral parameters based on the average installation or configuration process and including elements such as, but not limited to: average time per step, average mouse clicks, average keyboard inputs, back and forth between steps, etc. The system compares the baseline behavioral database with a single end user's actions, e.g. mouse cursor movements, keyboard input, time spent on a step, etc. Based on significant deviations that are defined by either the software vendor or the end user such as by establishing a normal range and/or threshold limits, the proactive help software system and method can prompt help notifications (including but not limited to vendor chat support pre-routed to the right technician/product team, specific steps within product documentation, or links to helpful videos) when it detects the induced confidence effect of user behaviors by communicating and comparing a single user's behavior with the behavior of another user or group of users.

In one example, a user is installing a complex Hadoop environment using a wizard, where Hadoop is known to be is a programming framework based on Java that offers a distributed file system and helps organizations process big data sets. This wizard prompts the user to connect remote compute nodes to a central server, but if the user is unable to reach the remote nodes, then the user must deviate from the wizard and research the issue on his own. The product may or may not be well documented so the user would need to resort to trying various fixes (based on the unique environment), or the user would need to find information for unfamiliar software, such as by looking at frequently asked questions FAQs from a Vendor A when the product is provided by a different Vendor B and not well documented. With the software installation assistance system and method, the single user is directed to the most ideal support channel (determined by the vendor and the user) based upon factors including, but not limited to, environment context, the current operating system, software version, dependencies, network configurations, etc. In a revised example, the user can be prompted to install a software patch or set of documentation to remedy the connection to the remote nodes.

By following the user's installation process and offering various types of assistance only when required, vendors are able to avoid abandonment of software by users due to problems that occur during installation. Additionally, installation and configuration processes can be completed according to the standards of the user's organization, for instance, without remote control support in one case, or defaulting to remote control support in another case.

Existing solutions to installation problems include live support, software configuration wizards, or workflows in addition to fully managed installation such as by step-by-step chat support. However, these solutions are not always ideal in use cases where software installations are very complex, or where bugs have emerged within the software prior to detection and patch support by the vendor. Wizards typically guide a user based on strict paths, but are not always helpful if unforeseen deviations, technical difficulties, and/or unusual scenarios occur due to a user's unique behavior. Additionally a business may sometimes use trial software without committing to a service or support agreement. This is especially true if the client is not familiar with the capabilities, installation requirements, or use. Finally, live support and fully managed installations are often costly and require handing over control of an environment to a third party which may not be desirable.

The software installation assistance system and method could be enabled as a stand-alone application that plugs into other applications, or it could be enabled as a feature of any current device or application. The system/method works in four major phases: (1) baseline identification, (2) user installation and configuration experience tracking, (3) deviation determination, and (4) proactive support based upon baseline deviations.

In the baseline identification phase 1, the system and method learns and logs (i.e. stores) what a typical installation or configuration process consists of by monitoring the behavior of a group of users installing the software. This can be done by using a client or server side agent which tracks and logs a group of user's steps, for example by monitoring mouse clicks, average time between screens, heat maps of user flow, etc. The tracking and logging could also be programed according to a vendor's expectations.

For the phase 2 of user installation and configuration experience tracking, the software installation assistance system and method tracks the behavior for a single user installation or configuration process such as by using a client or server side agent which tracks and logs the single user's steps, for example by monitoring mouse clicks, average time between screens, heat maps of user flow, etc., or by tracking and logging the single user's steps according to a preprogrammed routine in accordance with the vendor's expectations. The process can be enabled by default once the installation begins as a part of the installation executable file, or it could be appended as a separate add-on. The installation steps are logged so that the behavior of the single user's installation and configuration can be compared to the group's behavior stored in a database or the vendor programmatic instructions related to the group of users in the baseline identification phase 1.

For the deviation determination phase 3, the software installation assistance system and method compares the single user's behavior process logged in phase 2 with the logged data or programmatic instructions from the group of users in the baseline identification phase 1. This can be done by a variety of technologies including, but not limited to, optical character recognition for comparing inputs, variance calculation for required steps, time to completion of each step, and/or heat maps used to determine where a cursor remains on a screen display versus where it should be located at a given time or point during the installation process.

In the proactive support phase 4, the system and method will proactively determine and provide real-time recommendations for support based upon the comparison from phase 3. The support recommendations include, but are not limited to, direct connections to vendor chat support, links to specific areas of product documentation, links to installation videos, and/or recommendations and links to software add-ons and patches which could correct a specific problem being encountered by the single user.

Figures 4, 5:
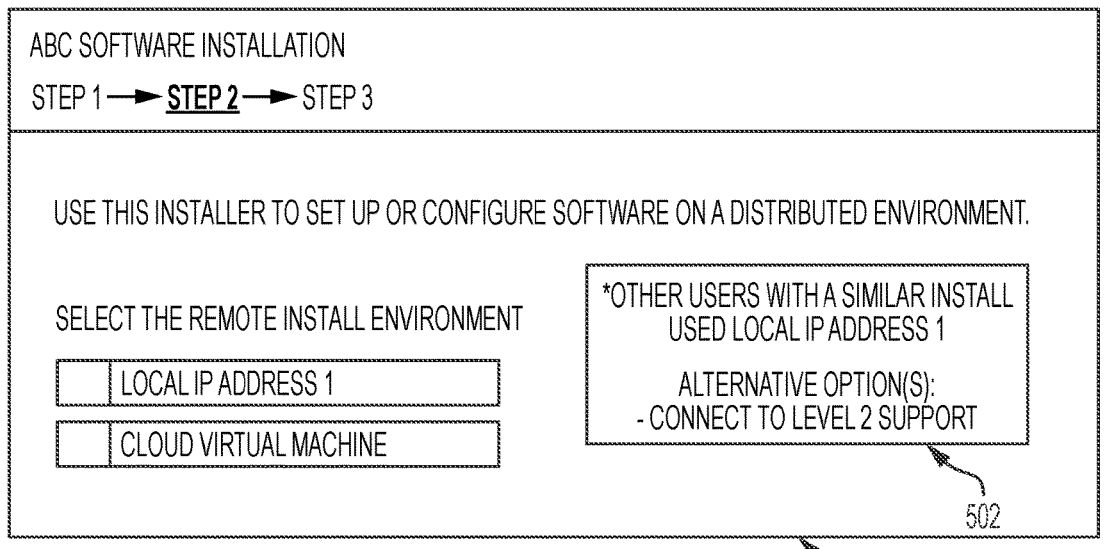
FIG. 4 is a table comparing average or typical data and times of a group of users for a baseline installation of software versus data and times of a single user during installation in accordance with embodiments of the present invention.
FIG. 5 is a screenshot which shows a proactive message presented to the single user in accordance with embodiments of the present invention.

FIG. 4 is a table comparing average or typical data and times of a group of users for a baseline installation of software versus data and times of a single user during installation in accordance with embodiments of the present invention. All of the times are measured in minutes.

In this example, the baseline data previously measured and stored for a group of users during installation of a software includes averages per user of 15 mouse clicks, 5 minutes spent in Menu A, 15 minutes spent in Menu B and a total installation time of 20 minutes. In comparison, the single user 1 has at this point during the installation used 5 mouse clicks, 30 minutes spent in Menu A, 0 minutes spent in Menu B, and a total installation time of 30 minutes. In this example, the vendor specifies that the installation process entails a baseline average of time to be spent by a group of users in Menu A as 5 minutes, and an average time to be spent in Menu B as 15 minutes. Moreover, the vendor also specifies that completion of Menu B is required before the single user should continue to Menu A. As seen from the table, the single user has not met this prerequisite since he spent zero minutes in Menu A. Hence, a message alert or recommendation for correction can be sent to the user. If desired, the system and method can proactively highlight the section of Menu B within the product documentation to alert the single user. Additionally, the vendor or the single user's organization can set thresholds for various inputs and the preferred next step for support. For example, if total installation time of the single user exceeds the baseline value by e.g. 30 minutes, then the system/method can proactively connect the single user to technical support.

FIG. 5 is a screenshot which shows a proactive message presented to the single user in accordance with embodiments of the present invention. The screenshot 500 includes a proactive message 502 that is presented to the single user as a recommendation as discussed above with regards to FIG. 4. In this example, the user could use Local IP address 1 which is a solution that has been effectively used by other users, or the user could alternately connect to Level 2 Support for assistance.

Figure 6:
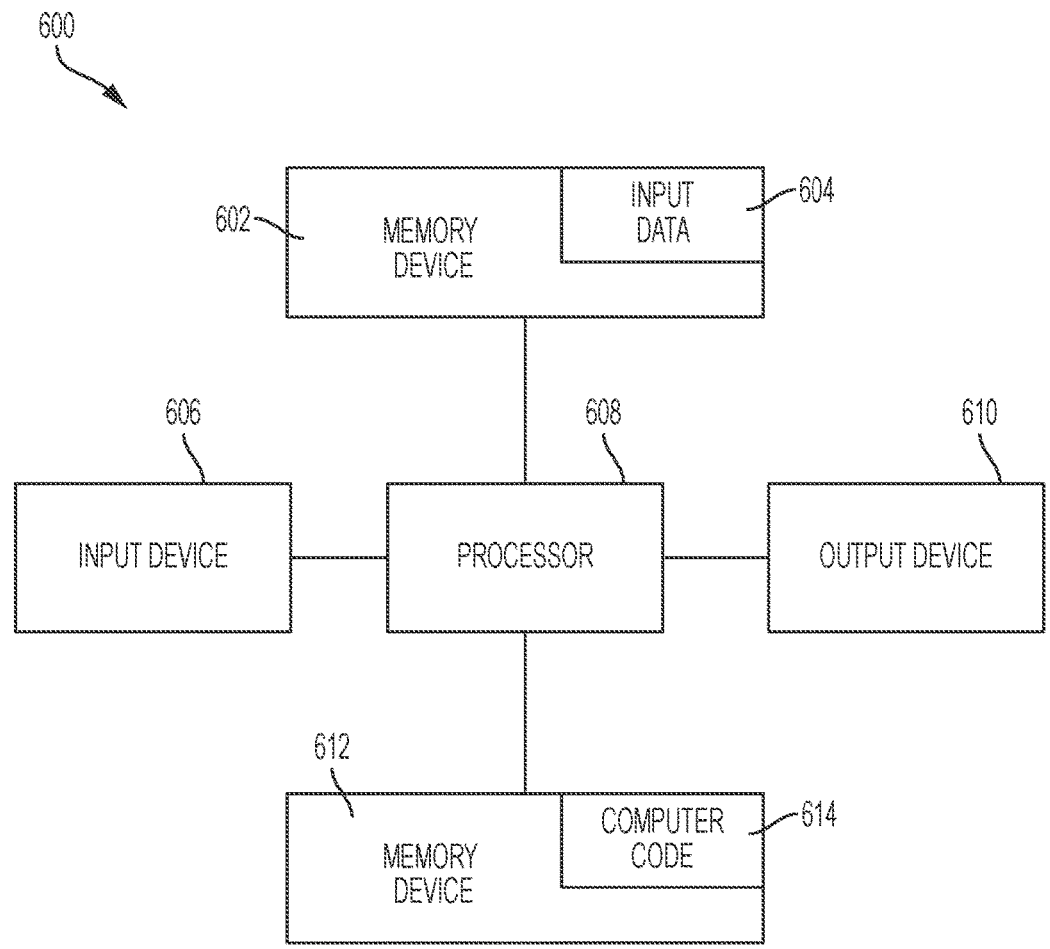
FIG. 6 illustrates an embodiment of a computer system used for implementing the methods of the present invention.

FIG. 6 is a block diagram of a computer system, aka computing device, 600 for implementing search engine optimization based upon most popular search histories in accordance with embodiments of the present invention. The computing device 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions.

The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614.

Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A software installation assistance method, comprising:
    monitoring, by a computing device, behavior and interactions of a group of users in a crowd for a crowdsource baseline installation of software, by tracking and storing parameters related to the behavior of the group of users, said parameters consisting of average time between actions of each of the users of the group, heat map data of user flow of the group of users, completion time of installation tasks, and completion time of configuration tasks, wherein the parameters are stored on the computing device;
    monitoring in real-time, by the computing device, behavior and interactions of a single user in regards to a single user installation or configuration of the software by tracking and storing the parameters related to the behavior of the single user during the single user installation, wherein the single user installation occurs subsequent to the crowdsource baseline installation;
    comparing, by the computing device, the behavior of the single user to the behavior of the group of users;
    identifying, by the computing device, a deviation of the behavior of the single user in comparison to the behavior of the group of users;
    receiving, by the computing device, remedies, suggestions and solutions to correct the deviation of the behavior of the single user from the behavior of the group of users;
    proactively offering, by the computing device, the remedies, suggestions and solutions to the single user to choose one of the remedies, suggestions and solutions to correct the deviation, wherein said remedies, suggestions and solutions are based upon behavior of the group of users determined using the parameters related to the behavior of the group of users; and
    the software and the single user based upon factors including environmental context of the single user and version of the software.

2. The software installation assistance method of claim 1, wherein step of the monitoring the group of users includes using an agent to sequentially track the parameters, wherein the parameters comprise installation or configuration parameters.

3. The software installation assistance method of claim 2, wherein said parameters further comprise user mouse clicks.

4. The software installation assistance method of claim 1, wherein step of the monitoring the single user's experience includes using an agent to sequentially track the parameters.

5. The software installation assistance method of claim 4, wherein said parameters further comprise user mouse clicks.

6. The software installation assistance method of claim 1, wherein step of the comparing is implemented from a group consisting of using optical character recognition, determining time differences for completion of installation tasks and configuration tasks, and determining cursor locations using heat maps.

7. The software installation assistance method of claim 1, wherein step of the proactively offering, by the computing device, technical assistance includes: a direct link to vendor chat; a link to product support documentation or tutorials; a link to an installation video; a link to a help page; and a link to a software add on or patch recommendation.

8. The software installation assistance method of claim 1, wherein step of the comparing further comprises: comparing, by the computing device, the behavior of the single user to pre-loaded behavior parameters of a vendor.

9. A computer program product, comprising one or more non-transitory computer readable hardware storage devices having computer readable program code stored therein, said program code containing instructions executable by a computing device to implement a software installation assistance method comprising:
    monitoring, by a computing device, behavior and interactions of a group of users in a crowd for a crowdsource baseline installation of software, by tracking and storing parameters related to the behavior of the group of users, said parameters consisting of average time between actions of each of the users of the group, heat map data of user flow of the group of users, completion time of installation tasks, and completion time of configuration tasks, wherein the parameters are stored on the computing device;
    monitoring in real-time, by the computing device, behavior and interactions of a single user in regards to a single user installation or configuration of the software by tracking and storing the parameters related to the behavior of the single user during the single user installation, wherein the single user installation occurs subsequent to the crowdsource baseline installation;
    comparing, by the computing device, the behavior of the single user to the behavior of the group of users;
    identifying, by the computing device, a deviation of the behavior of the single user in comparison to the behavior of the group of users;
    receiving, by the computing device, remedies, suggestions and solutions to correct the deviation of the behavior of the single user from the behavior of the group of users;
    proactively offering, by the computing device, the remedies, suggestions and solutions to the single user to choose one of the remedies, suggestions and solutions to correct the deviation, wherein said remedies, suggestions and solutions are based upon behavior of the group of users determined using the parameters related to the behavior of the group of users; and
    the software and the single user based upon factors including environmental context of the single user and version of the software.

10. The computer program product of claim 9, wherein step of the monitoring the behavior of the group of users includes using an agent to sequentially track the parameters, wherein the parameters comprise installation or configuration parameters.

11. The computer program product of claim 10, wherein said parameters related to the behavior of the group of users during the baseline installation further comprise user mouse clicks.

12. The computer program product of claim 9, wherein step of the monitoring the behavior of the single user includes using an agent to sequentially track the parameters related to the behavior of the single user during the single user installation.

13. The computer program product of claim 12, wherein said parameters related to the behavior of the single user during the baseline installation further comprise user mouse clicks.

14. The computer program product of claim 9, wherein the comparing step is implemented by the computing device from the group consisting of:
using optical character recognition of keyboard characters selected by the single user and the group of users during installation of the software;
using variance calculations of the parameters related to both the single user and the group of users during installation of the software;
determining time differences between actions by the single user and the group of users during installation of the software; and
determining cursor locations during the installation of the software by the single user and the group of users using heat maps.

15. The computer program product of claim 9, wherein step of the comparing further comprises: comparing, by the computing device, the behavior of the single user to preloaded behavior parameters of a vendor.

16. A system, comprising a computing device, said computing device comprising one or more processors, one or more memories, and one or more non-transitory computer readable hardware storage devices, said one or more hardware storage devices containing program code executable by the one or more processors via the one or more memories to implement a software installation assistance method comprising:
monitoring, by a computing device, behavior and interactions of a group of users in a crowd for a crowdsource baseline installation of software, by tracking and storing parameters related to the behavior of the group of users, said parameters consisting of average time between actions of each of the users of the group, heat map data of user flow of the group of users, completion time of installation tasks, and completion time of configuration tasks, wherein the parameters are stored on the computing device;
monitoring in real-time, by the computing device, behavior and interactions of a single user in regards to a single user installation or configuration of the software by tracking and storing the parameters related to the behavior of the single user during the single user installation, wherein the single user installation occurs subsequent to the crowdsource baseline installation;
comparing, by the computing device, the behavior of the single user to the behavior of the group of users;
identifying, by the computing device, a deviation of the behavior of the single user in comparison to the behavior of the group of users;
receiving, by the computing device, remedies, suggestions and solutions to correct the deviation of the behavior of the single user from the behavior of the group of users;
proactively offering, by the computing device, the remedies, suggestions and solutions to the single user to choose one of the remedies, suggestions and solutions to correct the deviation, wherein said remedies, suggestions and solutions are based upon behavior of the group of users determined using the parameters related to the behavior of the group of users; and
the software and the single user based upon factors including environmental context of the single user and version of the software.

17. The system of claim 16, wherein step of the monitoring the behavior of the group of users includes using an agent to sequentially track the parameters, wherein the parameters comprise installation or configuration parameters.

18. The system of claim 17, wherein said parameters related to the behavior of the group of users during the baseline installation further comprise user mouse clicks.

19. The system of claim 16, wherein step of the monitoring the behavior of the single user includes using an agent to sequentially track the parameters related to the behavior of the single user during the single user installation, and wherein said parameters related to the behavior of the single user during the baseline installation further comprise user mouse cocks.

20. The system of claim 16, wherein the comparing step is implemented by the computing device from the group consisting of:
using optical character recognition of keyboard characters selected by the single user and the group of users during installation of the software; using variance calculations of the parameters related to both the single user and the group of users during installation of the software;
determining time differences between actions by the single user and the group of users during installation of the software; and determining cursor locations during the installation of the software by the single user and the group of users using heat maps.

* * * * *